(12) United States Patent
Rivera et al.

(10) Patent No.: US 11,106,046 B2
(45) Date of Patent: Aug. 31, 2021

(54) SPLICE WITH CLADDING MODE LIGHT STRIPPING

(71) Applicant: nLIGHT, Inc., Vancouver, WA (US)

(72) Inventors: Chris A. Rivera, Portland, OR (US); Dahv A. V. Kliner, Portland, OR (US); Joseph Emery, Vancouver, WA (US)

(73) Assignee: nLIGHT, Inc., Vancouver, WA (US)

(*) Notice: Subject to any disclaimer, the term of this patent is extended or adjusted under 35 U.S.C. 154(b) by 0 days.

(21) Appl. No.: 15/686,100

(22) Filed: Aug. 24, 2017

(65) Prior Publication Data

US 2018/0059323 A1 Mar. 1, 2018

Related U.S. Application Data (60) Provisional application No. 62/380,312, filed on Aug. 26, 2016, provisional application No. 62/380,235, filed on Aug. 26, 2016.

(51) Int. Cl.
*G02B 6/26* (2006.01)
*G02B 6/42* (2006.01)
(Continued)

(52) U.S. Cl.
CPC ............. *G02B 27/10* (2013.01); *G01M 11/33* (2013.01); *G02B 6/14* (2013.01); *G02B 6/245* (2013.01); *G02B 6/2551* (2013.01); *G02B 6/2558* (2013.01); *G02B 6/2821* (2013.01); *G02B 6/4296* (2013.01); *H01S 3/0064* (2013.01);
(Continued)

(58) Field of Classification Search
CPC ...... G02B 27/10; G02B 6/2558; G02B 6/245; G02B 6/14; G02B 6/2551; G02B 6/4296; G02B 6/2821; G02B 6/2773; G02B 6/04; G02B 6/02042; H01S 3/0064;
(Continued)

(56) References Cited

U.S. PATENT DOCUMENTS 8,537,871 B2 9/2013 Saracco
10,261,329 B2 4/2019 Rivera et al.
(Continued)

FOREIGN PATENT DOCUMENTS

CN 105026971 11/2015

OTHER PUBLICATIONS

International Preliminary Report on Patentability from International Application No. PCT/US2017/048500, dated Feb. 26, 2019, 13 pages.
International Preliminary Report on Patentability from International Application No. PCT/US2017/048497, dated Feb. 26, 2019, 12 pages.
(Continued)

*Primary Examiner* — Kaveh C Kianni
*Assistant Examiner* — Hung Q Lam
(74) *Attorney, Agent, or Firm* — Klarquist Sparkman, LLP (57) ABSTRACT

Beam combining optical systems include a fiber beam combiner having multiple inputs to which output fibers of laser diode sources are spliced. Cladding light stripping regions are situated at the splices, and include exposed portions of fiber claddings that are at least partially encapsulated with an optical adhesive or a polymer. A beam combiner fiber that is optically downstream of a laser source has an exposed cladding secured to a thermally conductive support with a polymer or other material that is index matched to the exposed cladding. This construction permits attenuation of cladding light propagating toward a beam combiner from a splice.

12 Claims, 6 Drawing Sheets

(51) Int. Cl.
    *G02B 27/10*     (2006.01)
    *G02B 6/28*     (2006.01)
    *G02B 6/255*     (2006.01)
    *H01S 3/00*     (2006.01)
    *G01M 11/00*     (2006.01)
    *G02B 6/14*     (2006.01)
    *G02B 6/245*     (2006.01)
    *G02B 6/02*     (2006.01)
    *G02B 6/04*     (2006.01)
    *G02B 6/27*     (2006.01)
    *H01S 3/04*     (2006.01)
    *H01S 3/067*     (2006.01)
    *H01S 3/13*     (2006.01)

(52) U.S. Cl.
    CPC ............ *G02B 6/02042* (2013.01); *G02B 6/04* (2013.01); *G02B 6/2773* (2013.01); *H01S 3/0407* (2013.01); *H01S 3/06754* (2013.01); *H01S 3/06783* (2013.01); *H01S 3/1305* (2013.01)

(58) Field of Classification Search
    CPC ............... H01S 3/06754; H01S 3/1305; H01S 3/06783; H01S 3/0407; G01M 11/33
    USPC .............................................. 385/28, 33, 39
    See application file for complete search history.

(56) References Cited

U.S. PATENT DOCUMENTS

| | | |
|---|---|---|
| 2003/0002844 A1 | 1/2003 | DeRosa et al. |
| 2006/0163998 A1 | 7/2006 | Tiberi et al. |
| 2010/0135339 A1* | 6/2010 | Meleshkevich .... G02B 6/03616 |
| | | 372/6 |
| 2011/0091155 A1 | 4/2011 | Yilmaz et al. |
| 2012/0026749 A1 | 2/2012 | Armstrong |
| 2012/0045169 A1 | 2/2012 | Hu et al. |
| 2013/0087694 A1 | 4/2013 | Creeden et al. |
| 2014/0241385 A1 | 8/2014 | Fomin et al. |
| 2014/0270637 A1 | 9/2014 | Desbiens et al. |
| 2015/0043597 A1 | 2/2015 | Yusim et al. |
| 2015/0349481 A1 | 12/2015 | Kliner |
| 2017/0017036 A1 | 1/2017 | Botheroyd |
| 2019/0113702 A1* | 4/2019 | Fujita ................... G02B 6/2551 |

OTHER PUBLICATIONS

International Search Report and Written Opinion from International Application No. PCT/US2017/048497, dated Feb. 27, 2018, 20 pages.
International Search Report and Written Opinion from International Application No. PCT/US2017/048500, dated Feb. 28, 2018, 21 pages.
Wetter et al., "High power cladding light strippers," *Proc. of SPIE*, 6873:687327-1-687327-8 (2008).

* cited by examiner

SPLICE WITH CLADDING MODE LIGHT STRIPPING

CROSS REFERENCE TO RELATED APPLICATIONS

This application claims the benefit of U.S. Provisional Application No. 62/380,312, filed Aug. 26, 2016, and U.S. Provisional Application No. 62/380,235, filed on Aug. 26, 2016. Both applications are incorporated by reference herein in their entireties.

FIELD

The disclosure pertains to fiber optic systems for laser beam delivery.

BACKGROUND

Combining high power laser beams in multimode fibers requires the use of combiners that can withstand exposure to such high powers. Laser beams are typically confined by a fiber core that is surrounded by a glass cladding with a diameter that often exceeds the core diameter by many times (e.g. 100 µm core vs. 660 µm cladding). In order to couple power from input fiber cores to an output fiber, these input fiber cores must be optically coupled. This can be done by etching or tapering of the input fibers. However, one result of etching or tapering these input fibers is increased sensitivity to high beam powers, especially to beam portions that are guided in input fiber claddings. This often occurs due to small amounts of splice loss, modes leaking from the input fiber core, light scattered from the core to the cladding by fiber defects, etc. Beam portions guided by the input fiber cladding and stripped in the combiner produce heating that can lead to failure of the combiner or further increase the combiner's sensitivity to high power exposures.

SUMMARY

Optical systems comprise a fiber optic beam combiner that includes an input fiber. A laser source is optically coupled to a laser output fiber that is spliced to the input fiber of the fiber optic beam combiner. The input fiber of the fiber optic beam combiner includes a cladding light stripping region situated optically downstream of the splice. In some examples, the cladding light stripping region is secured with a polymer to a thermally conductive support. In other examples, a groove is defined in the thermally conductive support, and the cladding light stripping region is secured in the groove by the adhesive. In some examples, the adhesive is transparent and has a refractive index of between 1.4 and 2.0. In typical examples, the thermally conductive support is metallic. In additional embodiments, a heat transfer plate is in thermal contact with the thermally conductive support. In yet other examples, the fiber optic beam combiner includes a plurality of input fibers, and laser sources are optically coupled to respective laser output fibers that are spliced to corresponding input fibers of the fiber optic beam combiner. Each of the input fibers of the fiber optic beam combiner to which laser output fibers are spliced includes a cladding light stripping region extending optically downstream from the splice.

Optical apparatus comprise a first optical fiber and a second optical fiber. An optical splice couples the first optical fiber and the second optical fiber, and a cladding light stripping region at the optical splice extends from the splice along at least the first fiber so that a cladding of at least the first fiber is exposed. A transparent polymer is situated at the cladding light stripping region and encapsulates at least a portion of the exposed cladding of the first fiber. In some examples, the cladding light stripping region extends from the splice along both the first fiber and the second fiber so that the cladding of the first fiber and a cladding of the second fiber are exposed, wherein the transparent polymer encapsulates at least the portion of the exposed cladding of the first fiber and the exposed cladding of the second fiber. In further examples, the transparent polymer encapsulates the optical splice. In yet other examples, the cladding light stripping region extends a first distance from the splice along the first fiber and a second distance from the splice along the second fiber, wherein the first distance is greater than the second distance. In typical examples, the first distance is at least 5 mm, 7 mm, 10 mm, 50 mm, or 100 mm. In other embodiments, the transparent polymer is situated to secure at least the first fiber to a thermally conductive support. In still other representative examples, a groove is defined in the thermally conductive support, and at least a portion of the first fiber is secured by the transparent polymer to the groove. In some alternatives, the cladding light stripping region extends from the splice along both the first fiber and the second fiber so that a portion of the cladding of the first fiber and a portion of the cladding of the second fiber are exposed, and the transparent polymer encapsulates at least the portion of the exposed cladding of the first fiber and the exposed cladding of the second fiber and secures the first fiber and the second fiber to the thermally conductive support.

Methods include splicing a first fiber to a second fiber and removing a buffer coating from at least the first fiber at the splice to produce an exposed portion of a cladding of the first fiber. The exposed portion of the cladding is situated in a transparent polymer so as to attenuate light propagating in the cladding of the first fiber. In some examples, the transparent polymer has a refractive index between 1.3 and 1.7 or between 1.4 and 1.6. In still other examples, the first fiber and the second fiber are secured to a thermally conductive support with the transparent polymer.

Other methods include directing a beam from a laser beam delivery fiber to a beam combiner input fiber through an optical splice that couples the laser beam delivery fiber and the beam combiner fiber. Cladding light produced at the splice is attenuated with an exposed cladding portion of the beam combiner input fiber that is embedded in a transparent index matching polymer.

The foregoing and other features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation. Optical beams produced by lasers or other sources are referred as propagating in an upstream direction; optical component locations with respect to each other can be referred to as "upstream" or "downstream." Fiber claddings that are surrounded by a transparent polymer are referred to herein as being encapsulated in the transparent polymer. In the examples below, cladding light propagating away from a splice in any direction can be attenuated, but in many examples, attenuation of cladding light directed towards a beam combiner is especially important, and such cladding light stripping is referred to sometimes as directional.

Representative Combined Beam Optical Systems

Figure 1:
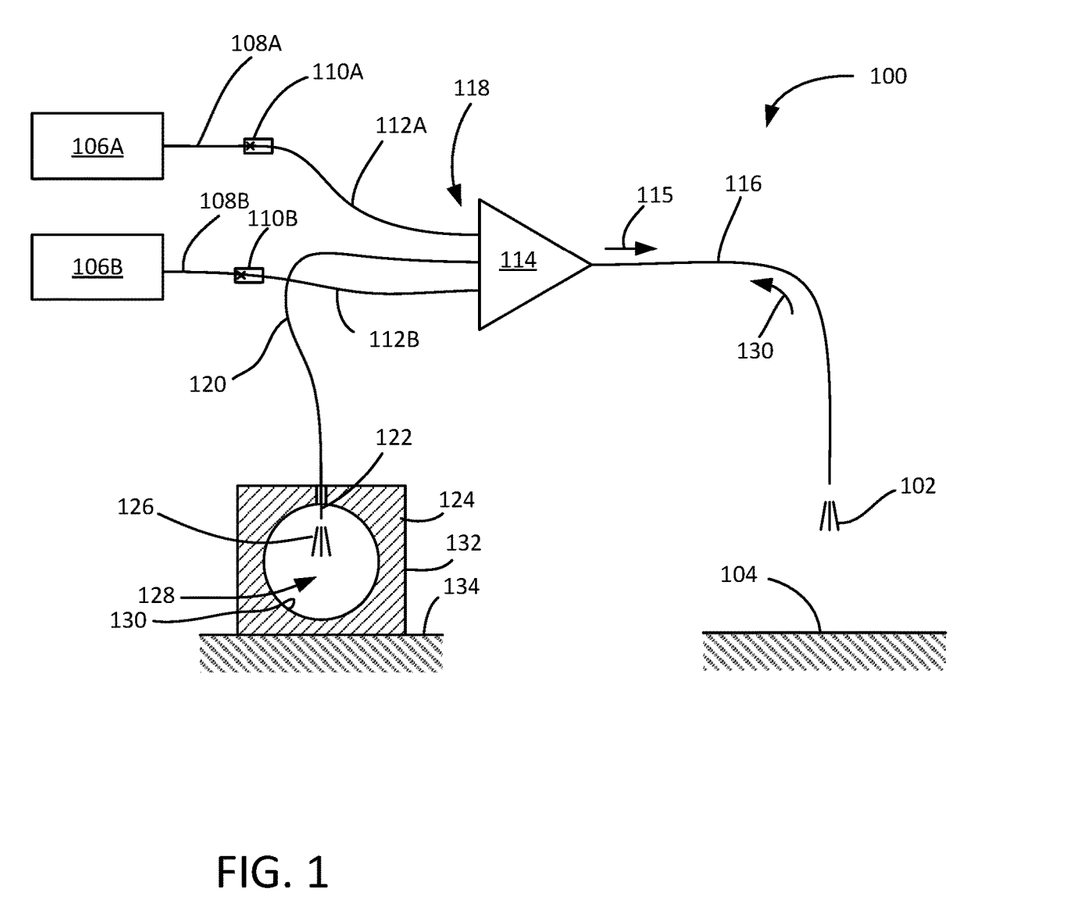
FIG. 1 illustrates a representative optical system in which signal beams are combined to form a combined beam.

With reference to FIG. 1, a laser system 100 is situated to produce a continuous-wave, quasi continuous-wave, pulsed, or other laser output beam 102 that typically provides average powers of greater than 4 kW. The laser output beam 102 is directed to a target 104, such as a metallic surface, for precision laser cutting, welding, or other applications. The laser system 100 includes laser signal sources 106A, 106B situated to produce and couple signal beams into respective signal fibers 108A, 108B. For example, in the generation of a 6 kW laser output beam, two 3 kW signal beams can propagate through each of the signal fibers 108A, 108B. The signal fibers 108A, 108B are spliced with respective cladding light stripping (CLS) fiber splices 110A, 110B to signal combiner input fibers 112A, 112B of a signal combiner 114. The signal combiner 114 receives and combines the signal beams to form a combined signal beam 115 that is coupled into a combiner output fiber 116. The combiner output fiber 116 emits the combined signal beam 115 as the laser output beam 102. In some embodiments, one or more additional output fibers, such as a delivery fiber, are coupled to the combiner output fiber 116 to deliver the laser output beam 102 to a laser head situated to direct the laser output beam 102 in relation to the target 104. Only two signal input beams are illustrated in FIG. 1, but one, two, three, or more can be used.

The signal combiner input fibers 112A, 112B are coupled to an input end 118 of the signal combiner 114 along with a separate input fiber 120 that is not coupled to a laser signal source. In representative examples, the separate input fiber 120 corresponds to a fiber that could otherwise be used to receive a signal beam. An input end 122 of the separate input fiber 120 is coupled to an interior region of an integrating beam dump 124. During operation of the laser system 100, a separate beam 126 can be formed that is associated with the laser output beam 102 and that propagates in a reverse direction from the laser output beam 102. The integrating beam dump 124 is situated to receive the separate beam 126 and to diffuse the separate beam 126 in an interior integrating volume 128 having one or more curved surfaces 130 so that the optical energy of the separate beam 126 is removed through a thermally conductive housing 132. The excess thermal energy is directed away through an attached conductive housing 134, such as a water-cooled cooling block. In representative examples, 50 W or greater of continuous power is received as the separate beam 126.

In a representative example, during operation, the laser output beam 102 can reflect at surface of the target 104 and cause a portion of the laser output beam 102 to be coupled back into the combiner output fiber 116 so as to form a backward propagating beam 130 that propagates in a direction opposite a direction of propagation of the combined signal beam 115. The backward propagating beam 130 can propagate back through the signal combiner 114 to reach and potentially damage the signal sources 106A, 106B or other components, such as the signal combiner 114. The combiner output fiber 116 or associated delivery fiber can break or fail causing additional resonant cavities to form within the laser system 100, such as between the fiber break and one or more Bragg gratings associated with the signal sources 106A, 106B, so as to produce the backward propagating beam 130. In some examples, the backward propagating beam 130 includes light at the wavelength at or near that of the signal sources 106A, 106B and light at one or more Raman wavelengths that is associated with stimulated Raman scattering (SRS). The separate beam 126 includes at least a portion of the backward propagating beam 130 and the integrating beam dump 124 is situated to remove at least some of the optical energy associated with the backward propagating beam 130. By directing the separate beam 126 to the integrating beam dump, technicians repairing or performing maintenance on the laser system 100 can safely injury from high power laser light reflecting within the interior of the housing of the laser system 100.

Figure 2:
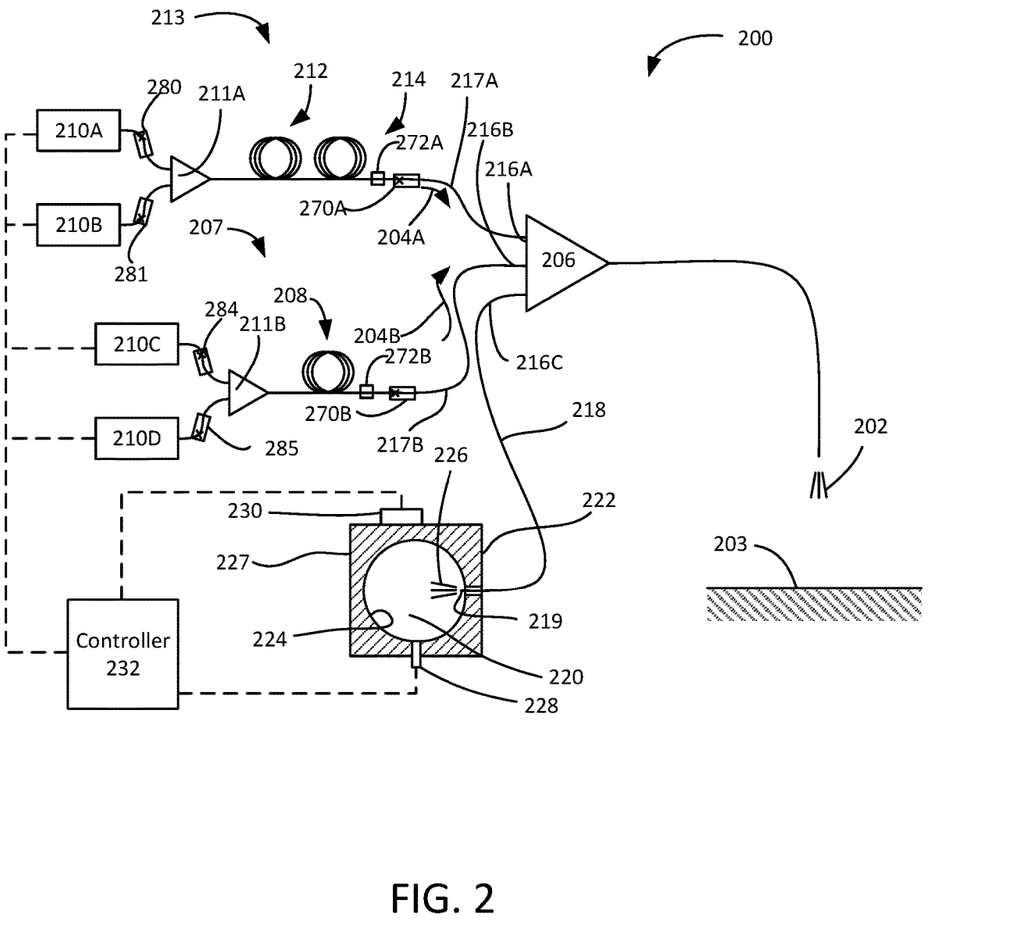
FIG. 2 illustrates another representative optical system that combines signal beams.

FIG. 2 shows another example of a laser system 200 that can deliver a laser output beam 202 such as a high power output beam to a target 203. The laser output beam 202 can have average power of 1, 2, 5, 10 kW or more or less, and is produced by combining a plurality of signal beams 204A, 204B with a signal combiner 206. The signal beam 204B is produced with a fiber laser system 207 that includes an oscillator 208 coupled to and pumped by diode pump sources 210C, 210D combined with a pump or pump signal combiner 211B. As shown in FIG. 2, the diode pump sources 210C, 210D are coupled to the signal combiner 211B with CLS splices 284, 285. The signal beam 204A is produced with a fiber laser system 213 that includes a master oscillator 212 coupled to one or more fiber power amplifiers 214. As shown in FIG. 2, diode pump sources 210A, 210B are coupled to a signal combiner 211A with CLS splices 280, 281. The signal beams 204A, 204B are coupled to corresponding signal combiner inputs 216A, 216B of the signal combiner 206 through respective input fibers 217A, 217B and associated CLS splices 270A, 270B that connect the signal combiner inputs 216A, 216B to the input fibers 217A, 217B. A separate input 216C of the signal combiner 206 is coupled to a length of fiber 218 having an open end 219 that is coupled to an interior volume 220 of a beam dump 222. The interior volume 220 is typically defined by one or more curved surfaces 224 that are suited for diffusing a reverse-propagating beam 226 associated with the laser output beam 202 that is directed into the interior volume 220 through the open end 219 of the fiber 218. The beam dump 222 is situated to remove the reverse-propagating beam 226 from the laser system 200 by reflecting the reverse-propagating beam 226 multiple times in the interior volume 220 and absorbing the diffused beam with a beam dump conductive housing 227.

A photodetector 228, such as a photodiode, is coupled to the beam dump 222 and in optical communication with the interior volume 220. The photodetector 228 is situated to detect one or more optical characteristics of the reverse-propagating beam 226, such as wavelength or power. A thermal sensor 230, such as a thermistor, is coupled to a conductive housing 227 of the beam dump 222 and is situated to detect a temperature variation of the conductive housing 227 that is associated with the power level and duration of the reverse-propagating beam 226. A controller 232 is situated to receive a signal from the photodetector 228 corresponding to the optical characteristics of the reverse-propagating beam 226 and a signal from the thermal sensor 230 corresponding to a temperature of the conductive housing 227. The controller 232 is further coupled to the diode pump sources 210A, 210B and is situated to change or disconnect power delivered to the diode pump sources 210A, 210B based on the detected characteristics of the reverse-propagating beam 226 and the conductive housing 227 so that the signal beams 204A, 204B can be deenergized. Thus, the beam dump 222 becomes a useful diagnostic tool to monitor and potentially disable one or more components of the laser system 200 based on the detection of the reverse-propagating beam 226.

Additional cladding light strippers such as cladding light strippers 272A, 272B can be provided to remove or attenuate upstream and/or downstream propagating cladding light. These cladding light strippers can be made in a variety of ways. Some examples use an epoxy that surrounds an exposed cladding surface of an optical fiber in which an output beam and cladding light are propagating. In other examples, an optical fiber includes one or more notches or other patterns ("microstructures") penetrating a circumference of an exposed cladding. The notches are operable to disrupt the propagating cladding light by directing the cladding light away from and out of the optical fiber without substantially altering light propagation in the fiber core. The out-coupled cladding light then impacts a surface of a conductive block and is eventually converted to heat to be dissipated through the conductive block. In other examples, silica-based crystals are formed on the cladding surface to scatter the cladding light out of the fiber without substantially altering light propagation in the fiber core Representative Cladding Light Strippers In FIGS. 1-2, cladding light strippers are situated at least partially optically downstream of fiber splices to remove or attenuate cladding light that is generated at a splice. In such optical systems, cladding light is generally not useful for material processing but can contribute undesirable heating or cause other problems. For example, beam combiners that receive multiple high power optical beams can be damaged if cladding light produced by splicing is not removed. In some cases, such cladding light strippers are water cooled to avoid thermal damage and are directional so as to preferentially strip cladding light propagating from a splice in a particular directions such as toward a beam combiner. As discussed below, cladding light strippers can be formed with a cladding light stripping section of optical fiber that is situated downstream (and upstream) of a fiber splice.

Figure 3A:
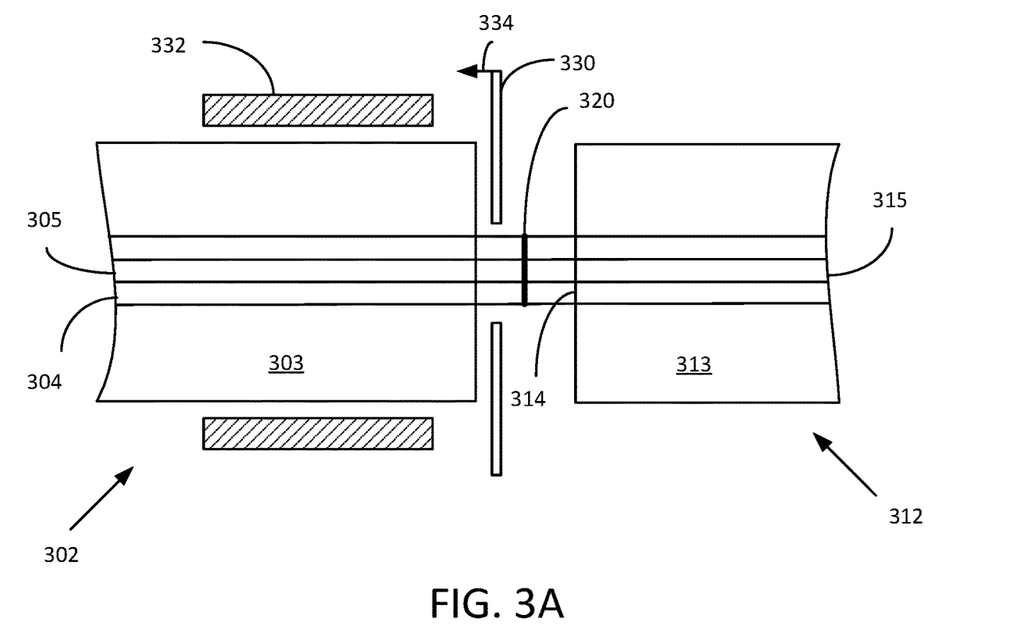
FIG. 3A illustrates a procedure for making a cladding light stripper (CLS) that preferentially strips cladding light directed away from a splice.
Figure 3B:
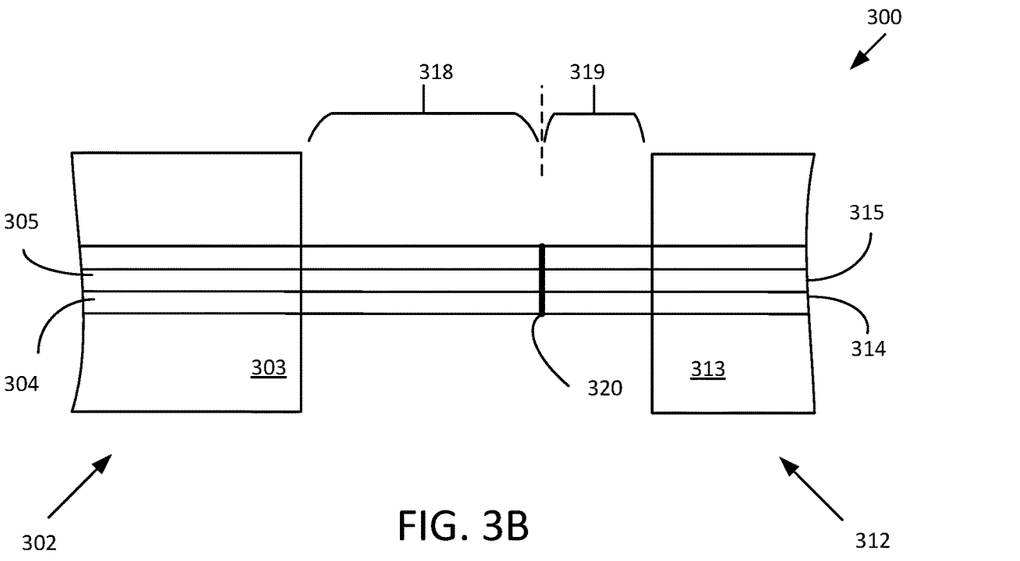
FIG. 3B illustrates a portion of a CLS formed as illustrated in FIG. 3A.

Fabrication of a representative CLS section of an optical fiber is illustrated in FIG. 3A and a resulting CLS fiber assembly 300 is illustrated in FIG. 3B. The optical fiber assembly 300 includes a first fiber 302 and a second fiber 312 that are optically coupled by a splice 320 such as a fusion splice. In typical examples, the splice 320 is formed by fusion splicing or other techniques and then tested using standard splice test criteria. The first fiber 302 and the second fiber 312 typically include respective buffer coatings 303, 313, claddings 304, 314, and cores 305, 315, but in other examples double clad or other fibers are used. The buffer coatings 303, 313 are shown as removed about the splice 320, as typically necessary for splicing. A thermal stripping or other heating element 332 is situated to warm the buffer coating 303 so that motion of the fiber assembly 300 toward a stripper blade 330 removes an additional portion of the cladding to produce a cladding stripping window 318 of the first fiber 302 that is generally longer than a length of a buffer stripped region 319 of the second fiber 312. Typically, cladding stripping windows are between 5 mm and 50 mm, 6 mm and 25 mm, and 7 mm and 10 mm long. In some cases, the cladding stripping window 318 is prepared when the first fiber 302 is prepared for splicing so that buffer coatings are removed along a longer section of the first fiber 302 than the second fiber 312.

Figure 4:
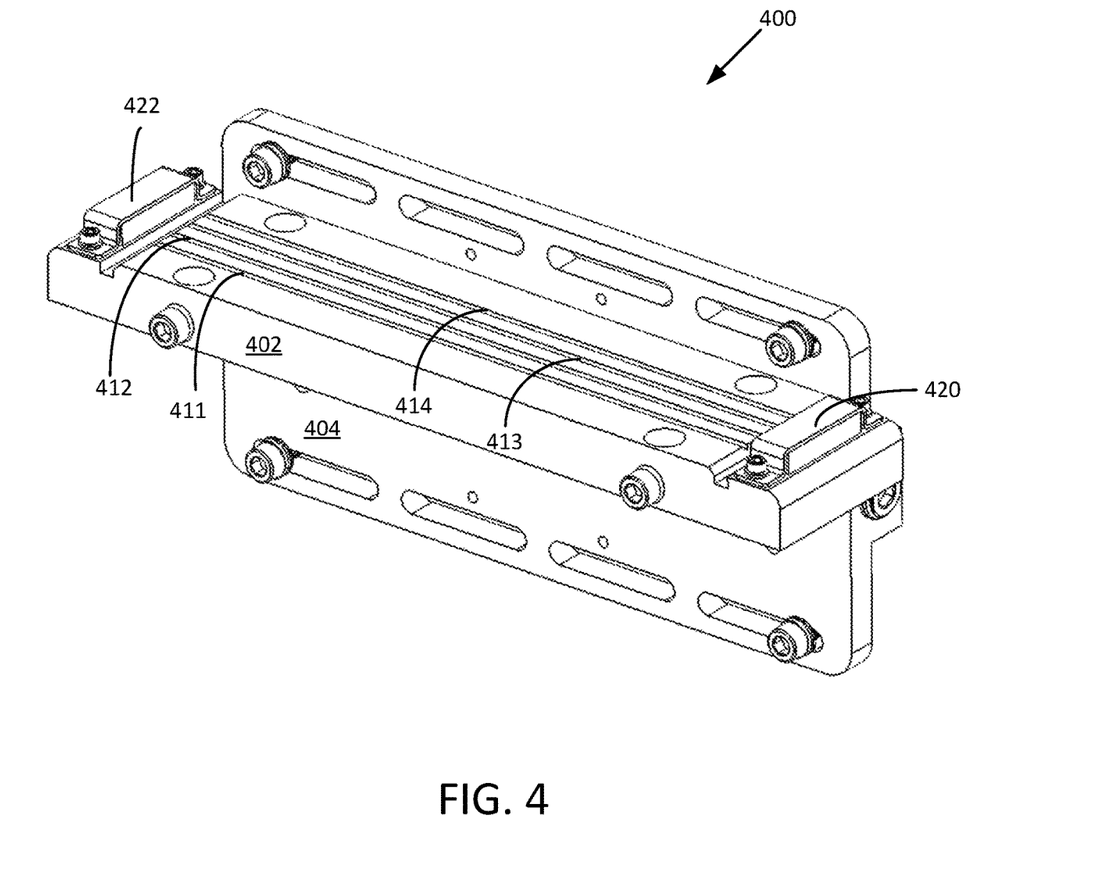
FIG. 4 illustrates an assembly that retains optical fibers having cladding stripped regions in grooves that can be filled with a material having an index of refraction selected so that cladding light is removed from or attenuated in the optical fibers.

Referring to FIG. 4, a CLS support assembly 400 includes a fiber support 402 that is thermally coupled to a heat transfer plate 404 that can be cooled with air, water, or otherwise cooled as may be convenient. Grooves 411-414 are provided in a surface 418 of the support plate 402. The grooves 411-414 are sized so that a stripped or unstripped fiber can be situated in a groove and secured to the groove with an adhesive having an index of refraction that approximately matching a fiber cladding index of refraction. Such indices of refraction are generally between about 1.3 and 2, and typically between 1.45 and 1.55. Ultraviolet or thermally cured adhesives can be used. A CLS window region as shown in FIG. 3B is typically situated in the groove thus has its cladding index-matched by the adhesive to strip cladding light. It is generally preferred to contact or encapsulate at least the splice between a laser delivery fiber and a beam combiner fiber to provide additional strength. The fiber support 402 and the heat transfer plate 404 are generally formed of a thermally conductive material such as a metal, and can include flow channels for liquid cooling or fins for air cooling. Clamps 420, 422 secure cladding stripped, jacketed, buffer coated, or other fiber portions to the fiber support 402.

Figure 5:
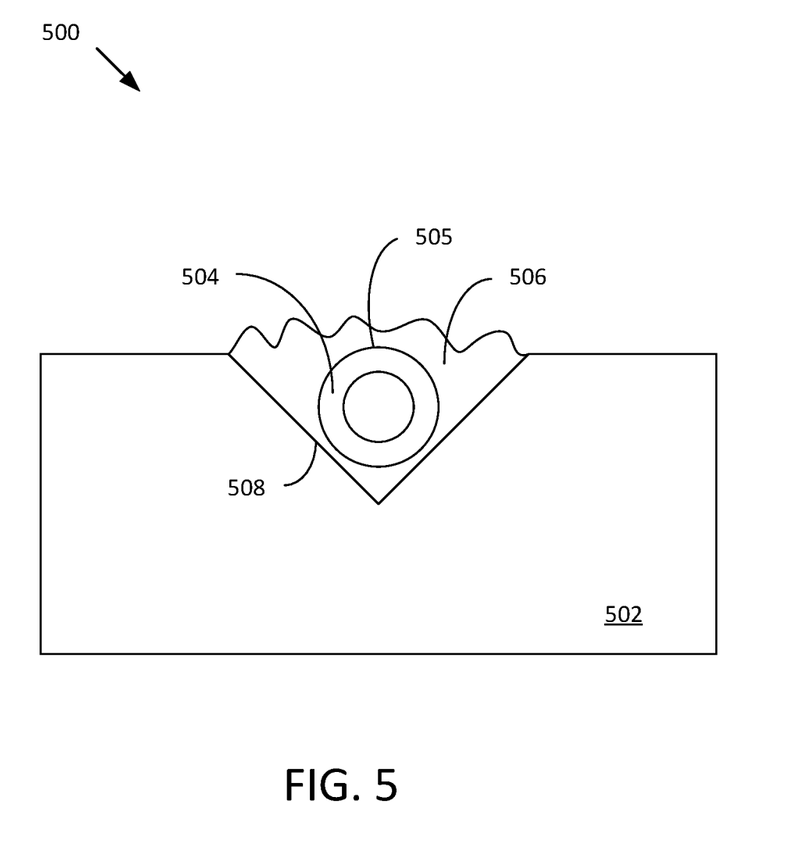
FIG. 5 is a sectional view illustrating an exposed fiber cladding that is encapsulated with a transparent polymer in a groove in a thermally conductive support.

Referring to FIG. 5, a thermally conductive support 502 shown in a sectional view includes a fiber 504 having an exposed cladding surface 505 situated in a v-groove 508 and retained in the v-groove 508 with a polymer 506. Although FIG. 5 shows a v-groove, other angular or curved shapes or combinations of shapes can be used. If desired, a groove can have a stepped-down portion sized to receive the cladding striping regions of fibers, and a larger portion to retain unstripped fibers. The thermally conductive support 502 is shown as a rectangular block, but blocks having curved surfaces such as spherical or elliptical surfaces or polygonal shapes can also be used. Thermally conductive materials such as metals are convenient.

Figure 6:
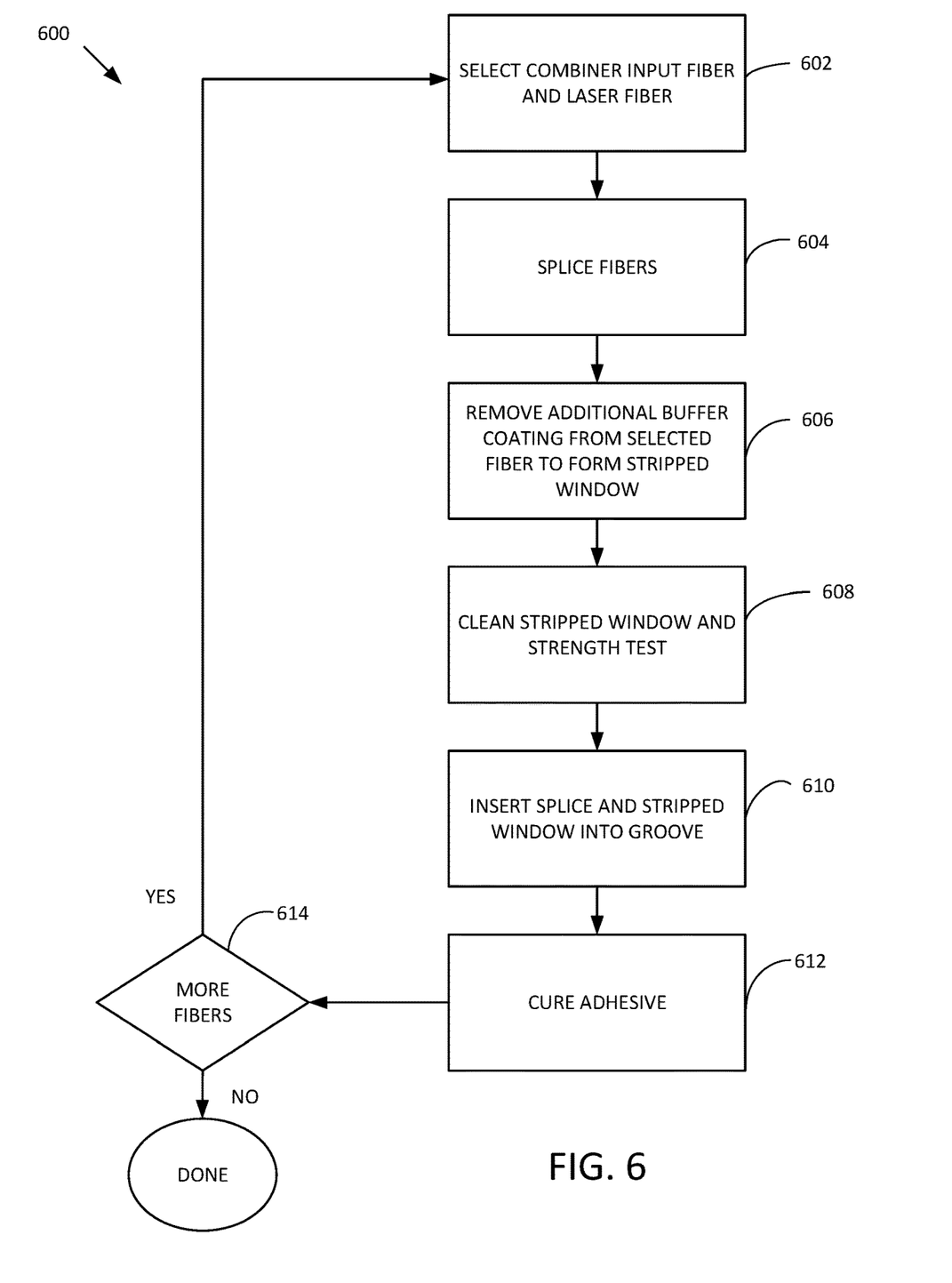
FIG. 6 is a block diagram of a representative method of coupling a laser beam delivery fiber to a beam combiner input fiber so as to attenuate cladding light directed toward the beam combiner.

FIG. 6 illustrates a representative method 600 of making a CLS window. At 602, a laser output fiber and a combiner input fiber are selected. At 604, these fibers are spliced by fusion splicing or otherwise, and at 606, the splice is then inserted into a thermally aided buffer stripping device such that the stripped blade avoids contact with the splice but can remove all buffer material over a region of 7-10 mm or more optically downstream of the splice. In some examples, an optically upstream (and/or downstream) fiber with respect to the splice is provided with a longer cladding light stripping region, i.e., a longer fiber length having an exposed cladding surface. At 608, the window stripped region is wiped using a piece of lens paper soaked in isopropyl alcohol to remove excess buffer fragments and the splice tested for longitudinal strength in a linear pull proof test tool. At 610, the splice and cladding stripped window are placed in a groove and secured with an index-matched polymer material that fills the groove. The polymer material is cured or otherwise hardened at 612 via UV irradiation, heat, or otherwise. The splice and CLS window can be further tested for thermal performance by enabling an input laser and measuring heating as a function of power to determine the maximum power handling of the composite optical configuration. At 614, it is determined if additional lasers and/or fiber inputs are to be processed. If so, the method 600 returns to 602.

Large power loads can be accommodated using a graded index polymer CLS such as described in U.S. Pat. No. 8,537,871. The refractive index of the adhesive or polymer securing the CLS window can be varied so that cladding light can be extracted at a preferred rate along the length of the CLS window. Similarly, an adhesive or polymer having a common index of refraction can be applied in an narrow portions near a splice followed by increasingly wider portions downstream of the splice. Removal of forward going cladding light and splice protection are generally the objectives in the disclosed examples, but protection from reverse-going cladding light based on light returning from a workpiece and can also be provided. The reverse going cladding stripped light (as well as the forward going cladding stripped light) could also be detected via photodiode or thermal sensing and be used for diagnostic purposes.

In some examples, CLS stripped and unstripped fiber portions are secured to a thermally conductive support with a polymer, and optically downstream CLS portions are longer or are otherwise situated to attenuate cladding light propagating toward beam combiners or other components. Fiber portions may or may not be fully encapsulated in a groove and may extend out of the groove, depending on, for example, groove depth. While the examples generally pertain to splices to beam combiners, the disclosed approaches can be generally used at any fiber splice.

In view of the many possible embodiments to which the principles of the disclosure may be applied, it should be recognized that the illustrated embodiments are only preferred examples and should not be taken as limiting the scope of the disclosure. We therefore claim all that comes within the scope and spirit of the appended claims.

We claim:

1. An optical apparatus, comprising:
a first optical fiber and a third optical fiber that are input fibers of a fiber optic beam combiner and a second optical fiber that is an output fiber of a laser source;
an optical splice that couples the first optical fiber and the second optical fiber;
a beam dump coupled to the third optical fiber;
a cladding light stripping region at the optical splice and extending from the splice along at least the first fiber so that a cladding of at least the first fiber is exposed; and
a transparent polymer situated at the cladding light stripping region and encapsulating at least a portion of the exposed cladding of the first fiber.

2. The optical apparatus of claim 1, wherein the cladding light stripping region extends from the splice along both the first fiber and the second fiber so that the cladding of the first fiber and a cladding of the second fiber are exposed, wherein the transparent polymer encapsulates at least the portion of the exposed cladding of the first fiber and the exposed cladding of the second fiber.

3. The optical apparatus of claim 2, wherein the transparent polymer encapsulates the optical splice.

4. The optical apparatus of claim 3, wherein the cladding light stripping region extends a first distance from the splice along the first fiber and a second distance from the splice along the second fiber, wherein the first distance is greater than the second distance.

5. The optical apparatus of claim 4, wherein the first distance is at least 5 mm.

6. The optical apparatus of claim 4, wherein the first distance is at least 7 mm.

7. The optical apparatus of claim 1, further comprising a thermally conductive support, wherein the transparent polymer is situated to secure at least the first fiber to the thermally conductive support.

8. The optical apparatus of claim 7, further comprising a groove defined in the thermally conductive support, wherein at least a portion of the first fiber is secured by the transparent polymer to the groove.

9. The optical apparatus of claim 7, wherein the cladding light stripping region extends from the splice along both the first fiber and the second fiber so that a portion of the cladding of the first fiber and a portion of the cladding of the second fiber are exposed, wherein the transparent polymer encapsulates at least the portion of the exposed cladding of the first fiber and the exposed cladding of the second fiber and secures the first fiber and the second fiber to the thermally conductive support.

10. The optical apparatus of claim 9, further comprising a groove defined in the thermally conductive support, and the encapsulated portions of the first fiber and the second fiber are secured in the groove by the transparent polymer.

11. An optical apparatus, comprising:
- a first optical fiber and a second optical fiber, wherein the second optical fiber is an input fiber of a fiber beam combiner;
- a third optical fiber that is an input fiber of the fiber beam combiner;
- an optical splice that couples the first optical fiber and the second optical fiber;
- a beam dump coupled to the third optical fiber to receive a backward propagating beam from the fiber beam combiner responsive to an input beam coupled from the first optical fiber to the second optical fiber by the optical splice;
- a cladding light stripping region at the optical splice and extending from the splice along at least the first fiber so that a cladding of at least the first fiber is exposed; and
- one or more notches penetrating a circumference of an exposed cladding.

12. The optical apparatus of claim 11, wherein the first optical fiber is coupled to a laser source.

* * * * *